(12) United States Patent
Dworkis et al.

(10) Patent No.: US 7,076,484 B2
(45) Date of Patent: Jul. 11, 2006

(54) AUTOMATED RESEARCH ENGINE

(75) Inventors: Charles H. Dworkis, Dallas, TX (US); Gregory P. Fitzpatrick, Keller, TX (US); Tze-Rong Fu, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 10/244,499

(22) Filed: Sep. 16, 2002

(65) Prior Publication Data

US 2004/0054662 A1 Mar. 18, 2004

(51) Int. Cl.
*G06F 17/30* (2006.01)
*G06F 7/00* (2006.01)

(52) U.S. Cl. ............... 707/5; 707/4; 707/10; 707/104.1
(58) Field of Classification Search ............. 707/1–206
See application file for complete search history.

(56) References Cited

U.S. PATENT DOCUMENTS

| | | | | |
|---|---|---|---|---|
| 5,444,823 | A | | 8/1995 | Nguyen ........................ 395/51 |
| 5,649,186 | A | * | 7/1997 | Ferguson ...................... 707/10 |
| 5,809,499 | A | | 9/1998 | Wong et al. .................... 707/6 |
| 5,924,090 | A | * | 7/1999 | Krellenstein ................... 707/5 |
| 6,021,409 | A | | 2/2000 | Burrows ...................... 707/102 |
| 6,041,326 | A | | 3/2000 | Amro et al. ................... 707/10 |
| 6,236,987 | B1 | * | 5/2001 | Horowitz et al. ............... 707/3 |
| 6,266,668 | B1 | * | 7/2001 | Vanderveldt et al. .......... 707/10 |
| 6,269,351 | B1 | * | 7/2001 | Black .......................... 706/15 |
| 6,434,556 | B1 | * | 8/2002 | Levin et al. .................... 707/5 |
| 6,510,406 | B1 | * | 1/2003 | Marchisio ....................... 704/9 |
| 6,556,982 | B1 | * | 4/2003 | McGaffey et al. ............ 706/50 |
| 6,636,848 | B1 | * | 10/2003 | Aridor et al. ................... 707/3 |
| 6,728,725 | B1 | * | 4/2004 | Garfield et al. ............. 707/102 |
| 6,757,646 | B1 | * | 6/2004 | Marchisio ....................... 704/8 |
| 6,980,984 | B1 | * | 12/2005 | Huffman et al. ................ 707/3 |
| 2002/0049704 | A1 | * | 4/2002 | Vanderveldt et al. .......... 707/1 |
| 2002/0049750 | A1 | * | 4/2002 | Venkatram ..................... 707/3 |
| 2002/0156763 | A1 | * | 10/2002 | Marchisio ....................... 707/1 |
| 2003/0115188 | A1 | * | 6/2003 | Srinivasa et al. ............... 707/3 |
| 2003/0115189 | A1 | * | 6/2003 | Srinivasa et al. ............... 707/3 |
| 2003/0212673 | A1 | * | 11/2003 | Kadayam et al. ............... 707/3 |
| 2004/0024739 | A1 | * | 2/2004 | Cooperman et al. ........... 707/1 |
| 2004/0030688 | A1 | * | 2/2004 | Aridor et al. ................... 707/3 |
| 2004/0034665 | A1 | * | 2/2004 | Haase ...................... 707/104.1 |
| 2004/0093328 | A1 | * | 5/2004 | Damle ........................... 707/3 |
| 2005/0021517 | A1 | * | 1/2005 | Marchisio ....................... 707/4 |
| 2005/0177555 | A1 | * | 8/2005 | Alpert et al. ................... 707/3 |

OTHER PUBLICATIONS

Lavrac, N. and I. Mozetic "Second Generation Knowledge Acquisition Methods and Their Application to Medicine", In Keravnou E., ed. Deep Models for Medical Knowledge Engineering, New York:Elsevier, 1992, pp. 177-198.*

(Continued)

*Primary Examiner*—Luke S Wassum
(74) *Attorney, Agent, or Firm*—Akerman Senterfitt

(57) ABSTRACT

A method of data retrieval and presentation over a network can include, responsive to an inquiry, querying at least one search engine in the network as specified by configuration attributes and the inquiry. References from the query can be received from the at least one search engine. The references can be processed according to research rules and a research model can be generated from the processed references.

28 Claims, 3 Drawing Sheets

OTHER PUBLICATIONS

Knoblock, C.A. "Planning, Executing, Sensing and Replanning for Information Gathering", Proceedings of the 14th International Joint Conference on Artificial Intelligence, 1995.*

Levy, A., A. Rajaraman and J. Ordille "Querying Heterogeneous Information Sources Using Descriptions", Proceedings of the 22nd International Conference on Very Large Databases, Sep. 3-6, 1996, pp. 251-262.*

Levy, A.Y., A. Rajaraman and J.J. Ordille "Query-Answering Algorithms for Information Agents", Proceedings of the 13th Nation Conference on Artificial Intelligence, 1996, pp. 40-47.*

Das, B. and D. Kocur "Experiments in Using Agent-Based Retrieval from Distributed and Heterogeneous Databases", Proceedings of the IEEE Knowledge and Data Engineering Exchange Workshop, Nov. 4, 1997, pp. 27-35.*

Ambite, J.L. and C.A. Knoblock "Flexible and Scalable Query Access Planning Using an AI Planner", Proceedings of the IEEE Knowledge and Data Engineering Exchange Workshop, Nov. 4, 1997, pp. 132-139.*

Adah, S., C. Bufi and Y. Temtanapat "Integrated Search Engine", Proceedings of the IEEE Knowledge and Data Engineering Exchange Workshop, Nov. 4, 1997, pp. 140-147.*

Odubiyi, J.B. et al. "SAIRE—A Scalable Agent-based Information Retrieval Engine", Proceedings of the 1st International Conference on Autonomous Agents, 1997, pp. 292-299.*

Genesereth, M.R. and A.M. Keller "Infomaster: An Information Integration System", Proceedings of the ACM SIGMOD Conference, May 1997, pp. 539-542.*

Hearst, M.A. and C. Karadi "Cat-a-Cone: An Interactive Interface for Specifying Searches and Viewing Retrieval Results using Large Category Hierarchy", Proceedings of the 20th Annual International SIGIR Conference, 1997, pp. 246-255.*

Bayardo, R.J. et al. "InfoSleuth: Agent-Based Semantic Integration of Information in Open and Dynamic Environments", Proceedings of the ACM SIGMOD Conference on Management of Data, 1997, pp. 195-206.*

Florescu, A., A. Levy and A. Mendelzon "Database Techniques for the World Wide Web: A Survey", ACM SIGMOD Record, Vo 27, No. 3, 1998, pp. 59-74.*

Craven, M. et al. "Learning to Extract Symbolic Knowledge from the World Wide Web", Proceedings of the 15th Conference of the American Association for Artificial Intelligence (AAAI-98), 1998, pp. 509-516.*

Knoblock, C.A. et al. "Modeling Web Sources for Information Integration", Proceedings of the 15th National Conference on Artificial Intelligence, 1998.*

Levy, A.Y. "Combining Artificial Intelligence and Databases for Data Integration", in "Artificial Intelligence Today: Recent Trend and Developments", Springer 1999, vol. 1600, pp. 249-268. ISBN 3-540-66428-9.*

Katz, V. and W-S. Li "Topic Distillation on Hierarchically Categorized Web Documents", Proceedings of the IEEE Knowledge and Data Engineering Exchange Workshop, Nov. 7, 1999, pp. 34-41.*

Craven, M. et al. "Learning to Construct Knowledge Bases from the World Wide Web", Artificial Intelligence, vol. 118, No. 1/2, 2000, pp. 69-113.*

Chakrabarti, S., M. van den Berg and B. Dom Focused Crawling: A New Approach to Topic-Specific Web Resource Discovery Computer Networks, vol. 31, 1999, pp. 1623-1640.* van Harmelen, F. et al. "Knowledge-Based Mate-Data Validation: Analyzing a Web-Based Information System", Proceedings o the 14th International Symposium on Informatics for Environmental Protection, 2000.*

Noy, N.F., R.W. Fergerson and M.A. Musen "The Knowledge Model for Protégé-2000: Combining Interoperability and Flexibility", Proceedings of the 2nd International Conference on Knowledge Engineering and Knowledge Management (EKAW 2000), Apr. 21, 2000.*

Levy, A.Y. and D.S. Weld "Intelligent Internet Systems", Artificial Intelligence, vol. 118, No. 1/2, 2000, pp. 1-14.*

Finkelstein, L. et al. "Placing Search in Context: The Concept Revisited", Proceedings of the 10th International World Wide We Conference, May 1-5, 2001, pp. 406-414.* van Harmelen, F. et al. "Ontology-Based Information Visualisation", Proceedings of the Workshop on Visualisation of the Semantic Web (VSW '01), Sep. 2001.*

Storey, M-A. et al. Jambalaya: Interactive Visualization to Enhance Ontology Authoring and Knowledge Acquisition in Protégé Proceedings of the Workshop on Interactive Tools for Knowledge Capture, Oct. 2001.*

Stuckenschmidt, H. and F. van Harmelen "Knowledge-Based Validation, Aggregation and Visualization of Meta-Data: Analyzin a Web-Based Information System", Proceedings of the 1st Asia-Pacific Conference on Web Intelligence (WI2001), 2001, pp. 217-226.*

Chen, H., H. Fan, M. Chau and D. Zeng "MetaSpider: Meta-Searching and Categorization on the Web", Journal of the America Society for Information Science and Technology, vol. 52, No. 13, 2001, pp. 1134-1147.*

Thakkar, S. et al. "Dynamically Composing Web Services from On-Line Sources", Proceedings of the AAAI Workshop on Intelligent Service Integration, Jul. 28, 2002.*

Fluit, C., M. Sabou and F. van Harmelen "Ontology-Based Information Visualization", in V. Geroimenko, ed., "Visualising the Semantic Web", Springer-Verlag, Oct. 29, 2002.*

Fluit, C., M. Sabou and F. van Harmelen "Supporting User Tasks through Visualisation of Light-Weight Ontologies", in S. Staab and R. Studer, eds., "Handbook on Ontologies in Information Systems", Springer-Verlag, 2003.*

Ding, Y. "Seminar: Ontology Learning", PowerPoint™ presentation, Digital Enterprise Research Institute, downloaded from www.deri.at, Summer 2003.*

*1997 IEEE Knowledge and Data Engineering Exchange Workshop (KDEX '97)*, <www.computer.org/proceedings/8230abs.htm>, (Nov. 4, 1997). Abstracts Only.

*Dr-Link, MNIS Text-Wise Labs,* <www.textwize.com/dr-link.html>, (Oct. 4, 2001).

* cited by examiner

AUTOMATED RESEARCH ENGINE

BACKGROUND OF THE INVENTION

1. Technical Field

The present invention relates to the field of information retrieval and presentation.

2. Description of the Related Art

Smarter, automated research tools are required for next-generation search engines. Increasingly, businesses, students, researchers, and the general public rely on the information available from network accessible resources, or "on-line" sources, typically accessed via conventional search engines. The tremendous volume of information available through on-line sources represents both an advantage for conducting research and a disadvantage in that a significant amount of irrelevant data must be filtered to determine pertinent data. Compounding this is the problem of information reliability. On-line sources, often updated and managed by private individuals, can contain outdated, misleading, and/or otherwise incorrect information. In consequence, discerning desired information from the significant amount of data available can be a daunting and time prohibitive task.

Conventional search engines accept queries and return lists of potentially relevant on-line sources such as Internet sites, databases, and/or Web pages. While most conventional search engines perform boolean logic searches using key words, others can process natural language queries. Typically, the list of results is ordered according to the internal prioritization rules of the search engine used. Other conventional search engines, however, order the list of results according to a predefined outline. While this approach is sufficient for narrowly tailored, simple queries, it is impractical for many research tasks such as generic queries into complex fields. In such instances, the returned list of potentially relevant sites can be unmanageably large. For example, a search on the term "protein" can result in hundreds of Web site matches and millions of Web page matches.

When confronted with such a large number of references, users often must visit several of the sites from the returned list, browse the sites, and attempt to use the information gleaned from the references to formulate a more tightly focused search. The new search produces a different list of references, more site browsing, and further focused searches. Conventional search techniques described herein can be frustrating and suffer from several disadvantages.

One such disadvantage is the inordinate amount of time which can be expended before relevant information is discovered. While some researchers succeed in determining a manageable list of references from a search using the aforementioned strategy, this success usually comes after spending an inordinate amount of search time. Other researchers become discouraged while searching sites and eventually surrender their search with little gain. Another disadvantage is that users must cross-reference multiple on-line sources to be assured of the validity and accuracy of a given source. Also, when visiting the references and investigating any secondary references, it can be difficult to keep track of which references were visited, which were not visited, and which references contained meaningful information. In consequence, users tend to visit Web pages multiple times leading to inefficiencies in network bandwidth usage and further wasted time. Finally, in order to minimize the significant number of on-line sources identified through a conventional search engine, a query often must be so narrowly tailored that critical information can be excluded.

A number of solutions have been proposed that attempt to limit the list of on-line sources generated by search engines. For example, one technique is to allow users to customize the behavior of existing search engines through user-defined plug-in programs. Another technique relies on statistical induction conclusions to extract probable classifications from highly structured normalized databases. Yet another technique attempts to produce an effective list of information sources using predefined filters and trained neural networks. The solutions proposed thus far, however, focus upon improving the returned list of potential sites. Users still must recursively browse a myriad of information sources before obtaining desired information.

SUMMARY OF THE INVENTION

The invention disclosed herein provides a solution for searching information sources within a communications network and presenting the information as a research model and/or research report. In particular, the present invention can search a variety of sources according to predetermined and user defined configuration attributes. The results can be combined and analyzed to formulate a research model illustrating the domain of the original query. From the research model, data relationships can be determined forming the basis of additional recursive sub-queries, the results of which can be incorporated into the research model. A research report can be generated from the research model. The present invention provides an automated research tool which can generate content from the determined query results. The resulting research model and research report can provide substantive information thereby relieving users from having to manually visit various information sources throughout a communications network.

One aspect of the invention can include a method of data retrieval and presentation over a network. The method can include, responsive to receiving an inquiry, querying one or more search engines in the network as specified by configuration attributes and the inquiry. For example, the configuration attributes can specify a list of search engines and query protocols associated with each of the search engines. Accordingly, the querying step can include translating the inquiry to a format associated with each of the search engines. The translating step can include expanding the inquiry to include additional search terms specified by an electronic dictionary and/or an electronic thesaurus.

References from the query or queries can be received from the search engines. The references from the various search engines can be processed according to research rules. For example, references from each of the search engines can be merged and duplicate results can be removed. The references can be prioritized according to a prioritization hierarchy specified by the research rules. Copies of the references can be retrieved and text from the results can be extracted. For example, any formatting and/or tags can be stripped from the retrieved references, and relevant text passages of the references can be determined. Relationships can be classified among the determined relevant text passages. The relevant text passages also can be parsed into domain types and domain subtypes. Notably, various associations can be identified within the relevant text passages. For example, associations such as acronyms, syntactic variants, synonyms, semantic variants, and domain associations can be identified. The search engines can be recursively queried using any of the aforementioned associations.

A research model can be generated from the processed results. For example, a relational graph representing the research model can be generated. The relational graph can include hierarchically ordered nodes, wherein each node specifies a concept term. The nodes, which can include attributes, can be interconnected with links specifying relationships among the nodes.

Notably, data patterns specified by the research rules can be identified within the relational graph. The search engines can be recursively queried for occurrences of the identified data patterns. Results from this search can be incorporated into the relational graph. A research report can be generated from the research model. The research report can specify a visual representation of the research model and a taxonomy specifying a domain of the research model. The research report further can specify one or more sets of text descriptions of key concepts and citations to references used in generating the research model.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a solution for searching information sources within a communications network and presenting the information in a coherent manner. In particular, a variety of sources can be searched according to user defined configuration attributes. The results of the search process can be combined and analyzed to formulate a research model illustrating the domain of the original query. From the research model, data relationships can be determined which can form the basis of additional recursive sub-queries, the results of which can be incorporated into the research model. A research report summarizing various aspects of the research model can be generated.

Figure 1:
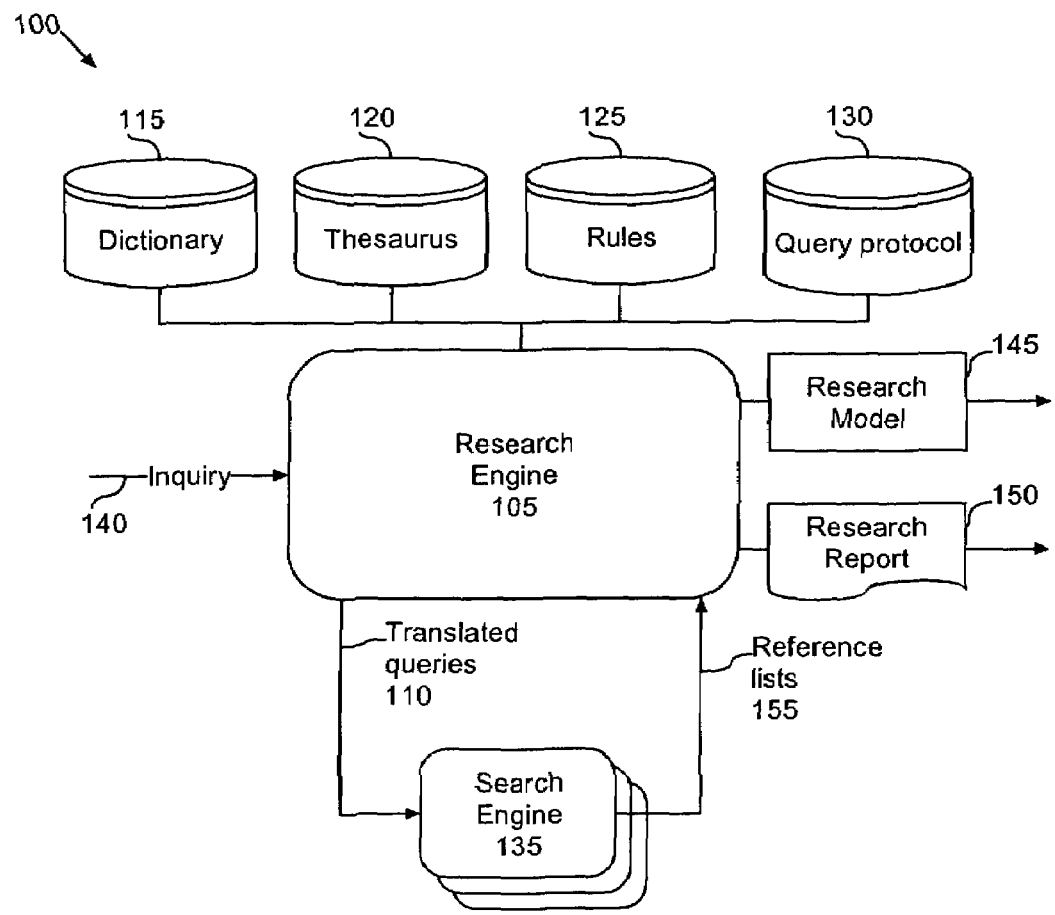
FIG. 1 is a high level block diagram illustrating one embodiment of an automated research system in accordance with the inventive arrangements disclosed herein.

FIG. 1 is a high level block diagram illustrating one embodiment of an automated research system 100 in accordance with the inventive arrangements disclosed herein. As shown in FIG. 1, the system 100 can include a research engine 105 which is communicatively linked to one or more data stores 115, 120, 125, and 130, as well as one or more search engines 135. The research engine 105 can be configured to receive an inquiry 140 from a user or other automated or semi-automated process and/or component. The inquiry can be specified as a boolean search using keywords, a natural language search, or any combination thereof. The particular manner in which the inquiry 140 is specified can vary so long as the research engine 105 can interpret the inquiry 140.

The research engine 105 can translate the received inquiry 140 into any of a variety of different formats utilized by designated search engines 135 for searching databases, Internet sites, Web pages, or any other searchable and network accessible document. The research engine 105 can process the received inquiry 140 and translate the inquiry to one or more queries, each having a format corresponding to a designated search engine 135. Each translated query 110 can be provided to the search engine 135 for which the translated query was intended. References received from the various search engines 135 can be processed or parsed to determine a research model 145 and an accompanying research report 150.

The various data stores 115–130 specify configuration attributes which can be used to process received inquiries as well as received query results. The configuration attributes can include pre-configured data as well as user configured data. For example, the dictionary data store 115 can include predefined terms for a variety of standardized subject domains. Still, a user can add, remove, and/or edit terms as may be required according to the particular domains corresponding to search or research needs of the inquiring individual or organization. Thus, the dictionary data store 115 can include terminology and definitions specifying related terms and/or domains. The thesaurus data store 120 can include synonyms for various search terms or dictionary defined terms as well as other variants as may be determined by a user with reference to the particular domain to be searched. Notably, the dictionary and thesaurus data stores 115 and 120 can specify designated search engines 135. For example, the various entries within the dictionary data store 115 and the thesaurus data store 120 can specify or cross-reference search engines 135 to be used when searching for a term specified by the entry. The specified search engine can be more suited to the domain to which the entry is associated.

The research rules data store 125 can include research rules detailing the prioritization of search results obtained from the designated search engines 135. For example, the research rules data store 125 can assign particular search engines greater priority than other search engines, specify priority of a given Universal Resource Locator (URL) according to the occurrence or frequency of one or more search terms within the reference, and the like. For instance, one search engine may be preferred for a given research task or domain, while another search engine may be preferred for a different research task or domain. Because search engines gather information in different ways and are constructed for different primary purposes, the ability to alter search engine preferences for different tasks can be beneficial. The research rules further can specify rules for parsing retrieved text, removing markup language tags, and determining key relationships, to be discussed with reference to FIG. 2.

The query protocol data store 130 can specify the designated search engines 135 to be accessed by the research engine 105. The query protocol data store 130 also can specify the particular protocol, syntax, and query format (hereafter collectively "format") used by each designated search engine 135 such that the research engine 105 can translate the inquiry 140 to one or more other queries directed to the designated search engines 135 as determined by the research engine 105. For example, one search engine 135 may require a query specifying discrete key terms linked with boolean logic, while another search engine 135 for searching a database may require queries to be specified using structured query language (SQL), Lightweight Directory Access Protocol (LDAP), or another proprietary format.

Accordingly, the query protocol data store 130 can include rules for translating the received inquiry 140 into one or more other query formats.

Figure 2:
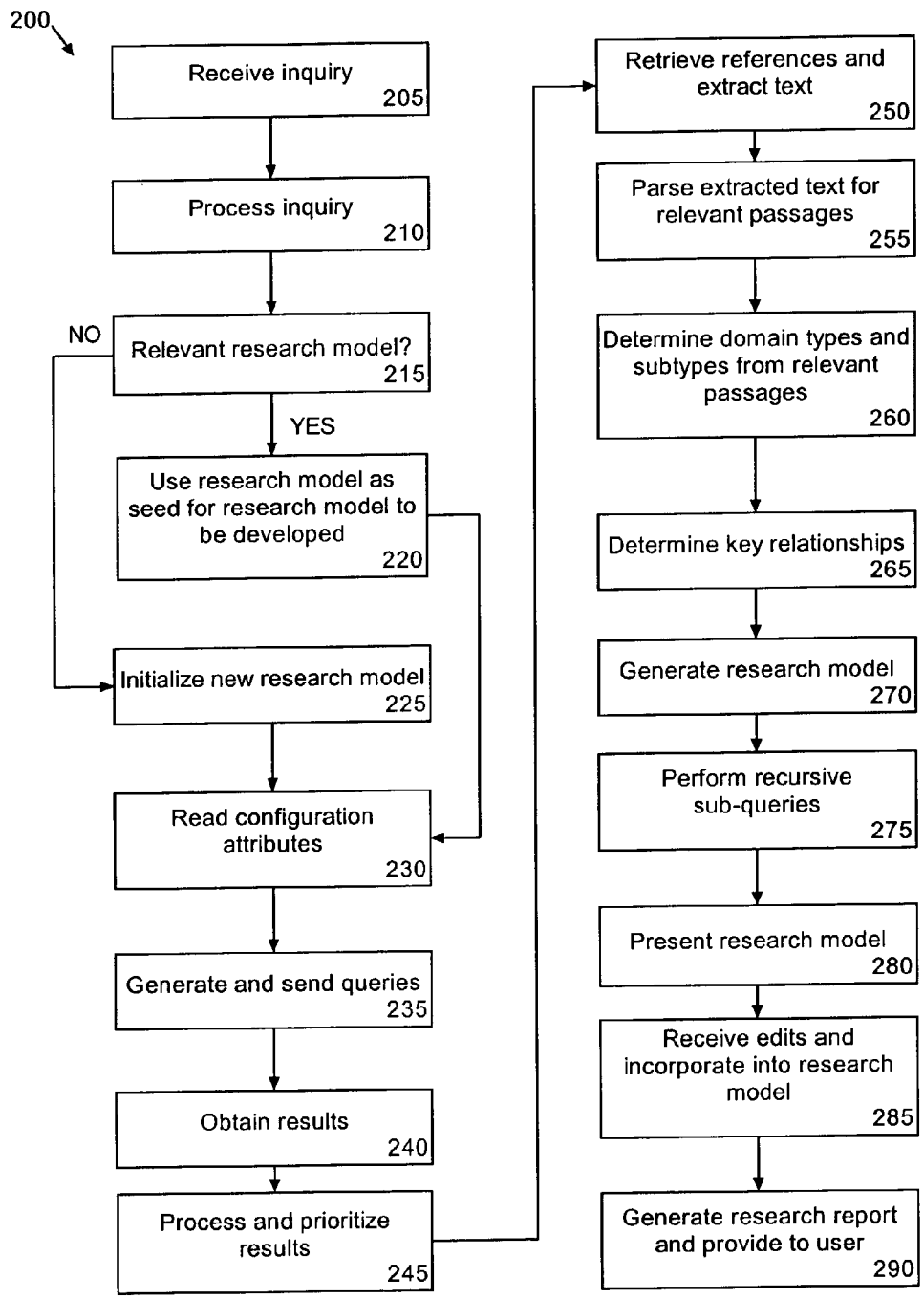
FIG. 2 is a flow chart illustrating a method of conducting research using the system of FIG. 1.

FIG. 2 is a flow chart illustrating a method 200 of conducting research using the system of FIG. 1. The method 200 can begin in step 205 where an inquiry can be received. As noted, the inquiry can be a natural language query, a boolean logic query specifying one or more search terms, or any combination thereof. In step 210, the research engine processes the received inquiry. For example, the inquiry can be parsed to identify keywords, search terms, and boolean operators. If the inquiry is a natural language inquiry, the language can be grammatically parsed to identify likely search terms and discard words which are not relevant to the subject or domain of the inquiry.

In step 215, the research engine can determine whether a relevant research model exists. In particular, using the search terms and operators identified in step 210, the research engine can examine previously determined research models to determine whether the domains, types, and/or sub-types of an existing research model include any common information such as search terms. This determination can be performed with reference to the dictionary and thesaurus data stores. That is, the search for an existing research model can be expanded to include terms specified by the dictionary and/or thesaurus data stores which are synonymous and/or related to terms of the inquiry. Accordingly, although an inquiry may not include terminology that is identical to an existing research model, the research engine can identify related research models by cross referencing the research model terminology with the inquiry terminology using the dictionary and thesaurus data stores. As the dictionary and thesaurus data stores can include both predetermined information as well as user configured information, the user can specify relationships between terms and domains such that the research engine can identify relationships among inquiries and existing research models despite the existence of only an indirect relationship between the inquiry and research model.

If one or more existing research models are found to have an association with the received inquiry, the method can continue to step 220. In step 220, the identified research models can be used as a seed or basis for generating a new research model. In particular, attributes from the identified research models can be used as a baseline model in combination with the steps to be described with reference to FIG. 2. For example, Internet sites, search engines, databases, and/or Web pages used in the existing research model can be given higher priority than had no related research model been identified. Similarly, previously identified relationships between domain types, domain subtypes, and text passages of the existing research model can be re-examined by the research engine and used in recursive searches to be described herein in greater detail. After step 220, the method can proceed to step 230.

If no existing research model is relevant to the inquiry, however, the method can proceed to step 225, where a new research model is initialized. In step 230, the research engine can read the configuration attributes. For example, the research engine can access the dictionary data store and the thesaurus data store to identify alternative search terms and phrases to those specified in the inquiry. Accordingly, the research engine can broaden the scope of the inquiry to encompass synonymous, related, and/or relevant terms without requiring the user to specify an unduly large or complex inquiry. As the dictionary and thesaurus data stores can include references to designated search engines suited to the subject matter of that entry, the research engine further can identify those search target engines which will be searched in response to the broadened inquiry. Still, it should be appreciated that the target search engine can be specified by the research rules data store.

In step 235, the research engine can generate and send queries based upon the initial inquiry. The research engine can access the rules of the query protocol data store to determine the query format associated with the target search engines. Accordingly the research engine can translate the received inquiry into one or more queries to be directed to the target search engines. Thus, each resulting query can conform the format required by the particular search engine to which the query is to be directed.

In step 240, results from the various target search engines can be received by the research engine. For example, from each of the target search engines, the research engine can receive a listing of references in response to the queries provided. In step 245, the received references can be processed and prioritized. For example, the research engine can merge the various lists of URLs into a single list, remove duplicate URLs, and prioritize the remaining list according to the prioritization hierarchy specified by the research rules.

In step 250, copies of the references specified by the processed listing of references can be retrieved. The text of the retrieved references can be extracted by removing any formatting tags or other embedded electronic document overhead. For example, any visual formatting of the text, content labeling of the data, or other data annotations can be removed from the retrieved references. The resulting text can be queued as a series of prioritized articles. Accordingly, in step 255, the research engine can begin substantively analyzing the prioritized articles. In particular, the text of each article can be parsed to identify relevant passages. For example, the text can be searched for passages including original inquiry terms, other terms which have been identified as being related through previous research results or models, synonyms of original inquiry terms, as well as linguistic variants of an inquiry term.

In illustration, if an inquiry specified the term "protein", text passages explicitly mentioning the term "protein" can be tagged as most relevant. Other text passages mentioning "osmophobic" or "thermodynamic" can be tagged as relevant due to the existence of another related research model specifying those terms in relation to the term "protein." Text passages mentioning "organic compound" can be tagged as relevant if the thesaurus data store specifies that "organic compound" is a synonym of "protein." Additionally, linguistic variants such as "it" or "they" found within a given range of an identified term can be tagged as relevant. The research engine can extract and store text surrounding the identified terms, whether a sentence, a paragraph, or a page. The extracted text can be stored in addition to a citation referencing the origin of the text. Non-relevant passages can be discarded.

In step 260, the research engine can grammatically parse the extracted information to determine subject-verb modifier phrases. Subject terms can be regarded as domain types within the research model under development. Modified subject terms can be regarded as domain subtypes within the research model. Insignificant terms, which can be specified through filter rules or an ignorable words list can be filtered or removed from the text. Continuing with the previous example, the term "protein" can be identified as a subject and therefore a domain type. Terms such as "intracellular protein" and "denatured protein" which include modifiers can be identified as domain subtypes.

Taking another example, if the text passage " . . . organic osmolytes have the ability to stabilize intracellular proteins against commonly occurring denaturing environmental stresses . . . " was identified, the research engine can parse the text passage and determine several relationships. The terms "osmolyte", "protein", and "stress" can be identified as domain types. The terms "organic osmolyte", "intracellular protein", and "environmental stress" can be identified as domain subtypes.

In step 265, key relationships can be determined. Within the research rules data store, the research rules can specify various word relationships for which the research engine can search in the extracted text. For example, the research engine can parse the extracted text to identify the following relationships: (a) domain type/subtype relationships based upon variants of "x is a y"; (b) possessive relationships based on variants of the form "x has a y"; (c) causal relationships based on the form "x causes y"; (d) property relationships based on variants of the form "x is attributed to y"; (e) spatiotemporal relationships based on variants of the form "x occurs at y"; and (f) additional custom relationships based upon user configured rules. Thus, within the example text " . . . organic osmolytes have the ability to stabilize intracellular proteins against commonly occurring denaturing environmental stresses . . . ", the research engine can determine that one attribute of "organic osmolytes" is the ability to stabilize intracellular proteins against commonly occurring denaturing environmental stresses which can be specified as "ability(stabilize, intracellular protein, denaturing environmental stress)."

Notably, the research rules further can specify a course of action given the existence of particular word and/or text associations within a text passage including, but not limited to acronyms, syntactic variants, synonyms, semantic variants, and domain associations. For example, the research rules can specify that a search is to be initiated for each identified acronym such that the resulting research model and report include information about the acronyms. Acronyms can be identified by identifying terms in all capital letters, using grammatical rules, and/or by specifying the terms within the dictionary and/or thesaurus data stores.

Each of the aforementioned word and/or text associations identified within relevant text passages can be recursively identified within newly determined search results and recursively submitted to the various search engines to progressively acquire additional information. Taking another example, an original query for "DNA" can reveal that A, C, T, and G are relevant terms. Additional searching guided by the research rules can indicate that "A" is a syntactic variant abbreviating Adenine, that Adenine and Guanine are both Purines, that Purines and Pyrimidines are both nitrogen based nucleotides, that nucleotides can bond with carbon sugars, and so forth. In this example, the system recursively submits queries for Adenine, Purine, Nucleotide, and Carbon to progressively acquire further facts.

In step 270, having identified the key relationships as well as the domain types and subtypes, a research model can be generated to summarize information discovered as a result of the inquiry. The research model can be formulated as a relational graph where nodes representing domain types are linked with child nodes clustered around the domain type. The child nodes represent the domain subtypes. Each of the nodes, whether a domain type or a domain subtype can include one or more attributes. Any incidental terms occurring infrequently can be pruned from the research model.

Accordingly, the resulting clusters of domain types and domain sub-types represent the hierarchy between general and more specific concepts.

In step 275, the research engine can analyze the research model to identify patterns within the research model. The research rules can specify particular relationships of interest in the research model. For example, the research rules can indicate that attributes which co-occur within one concept may be relevant to peer concepts, that concepts which share common attributes may form clusters of potential significance, relationships which divide clusters into mutually exclusive subsets are potentially significant, relationships which generate intersections among distinct clusters are potentially significant. The research engine can apply the research rules to the research model and formulate additional sub-queries to provide the target search engines. For example, the sub-queries can specify new combinations of search terms such as domain types, domain subtypes, and attributes as determined from the research rules and the relational graph.

Exemplary pattern rules can include "if type X has attribute Y, then search for other types with attributes of Y" and "if type X has attribute Y, then search for X having an attribute Y with alternative values for Y." Continuing with the previous example, execution of the exemplary pattern rules can generate sub-queries such as "are there other items like organic osmolyte which share the ability to stabilize intracellular protein" and "can organic osmolyte stabilize other elements besides intracellular protein." The results of the sub-queries can be incorporated into the existing research model.

The determined research model can be presented to a user in step 280. In step 285, one or more user inputs can be received for accepting, rejecting, and/or editing the research model. For example, the user can add elements to the research model, delete elements from the research model, and/or reorder the contents of the research model. Once the model is accepted by the user, the method can continue to step 285 where any received edits to the research model can be incorporated. In step 290, the research engine can generate a research report and provide the research report to the user. The research report can include the relational graph of the research model, a taxonomy outlining the domain of the research model, text descriptions of key concepts, attributes and relationships, as well as citations linking derived results to the original source documents. The resulting research model and research report can be stored for subsequent use.

Figure 3:
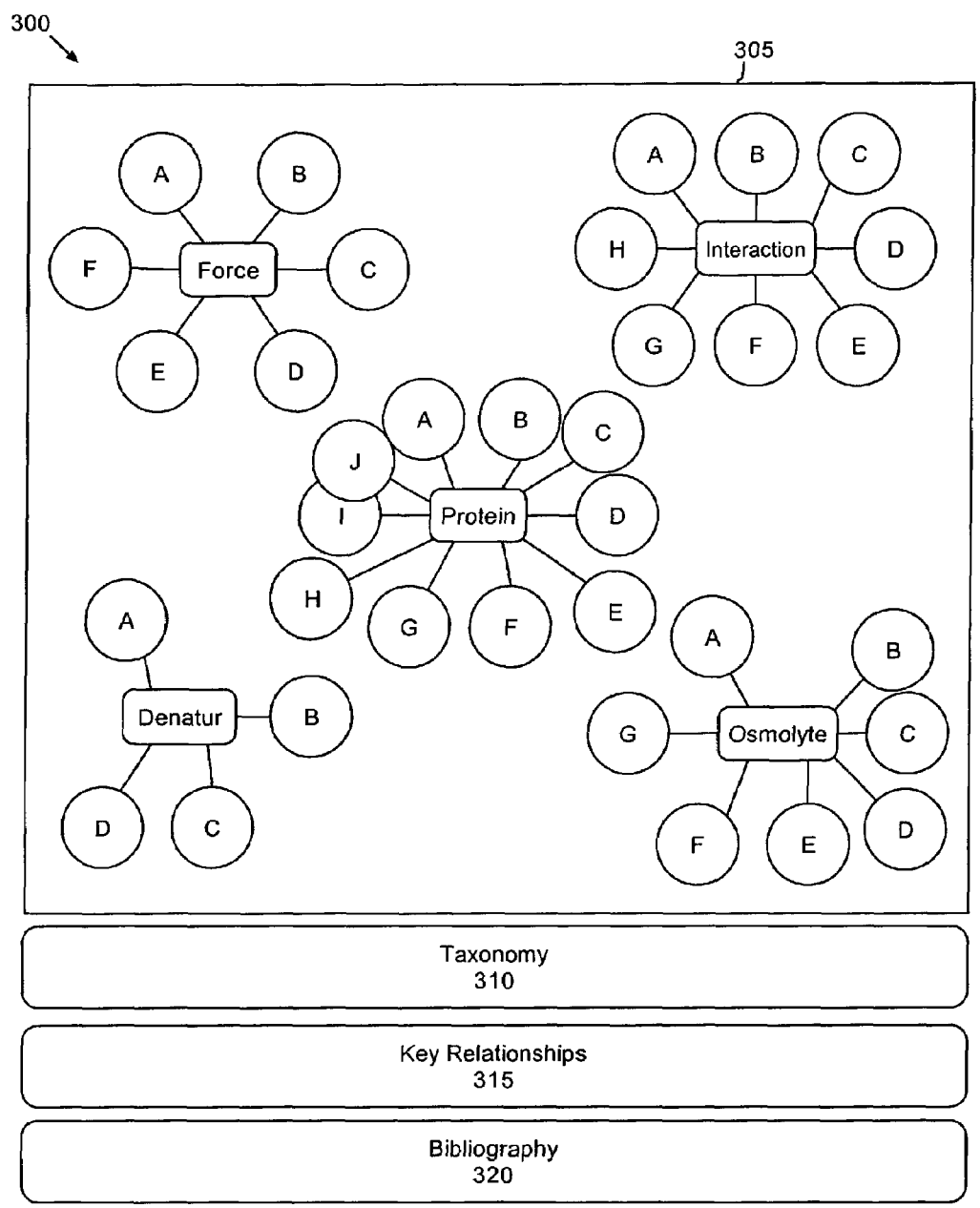
FIG. 3 is schematic diagram illustrating an exemplary research report in accordance with the inventive arrangements disclosed herein.

FIG. 3 is schematic diagram illustrating an exemplary research report 300 in accordance with the inventive arrangements disclosed herein. The research report 300 can include four primary sections. Section 305 is the relational graph illustrating the research model (or domain model) portion of the research report. As shown, section 305 includes several clusters of a central domain type surrounded by domain sub-types nodes. An excerpt from an exemplary domain model is depicted in Appendix A.

Section 310 is the taxonomy section of the research report. The taxonomy section can be a recursive list of domain types and domain subtypes, where a subtype is any pattern of consecutive keywords, and keywords are frequently occurring nouns. Accordingly, section 310 can include the terms specified by each of the domain types followed by the terms specified by each domain sub-type associated with the domain type. An example of a taxonomy for the term "osmolyte" can be "organic osmolyte, protecting osmolyte, and non-protecting osmolyte." An exemplary taxonomy section is illustrated in Appendix B. Each bulleted and bolded term listed beneath the "Taxonomy" heading can correspond to a central domain type. The terms following each central domain type can correspond to the nodes A, B, C, etc. which correspond to the domain sub-types.

Section 315 is the key relationships section of the research report. Section 315 can include the portions of extracted text considered relevant from the key relationship parsing step. Notably, any terms specified by the key relationship rules can be highlighted and/or used as headings for the text portions. An exemplary and abbreviated "Key Relationships" section is illustrated in the Appendix. The "Key Relationships" section can include portions of text extracted from the various identified references which correspond to one or more, if not all, of the central domain types. Finally, section 320 of the research report can be the bibliography section listing citations to the various references utilized by the research engine.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of data retrieval and presentation over a network comprising:
    responsive to receiving an inquiry, querying at least one search engine in said network as specified by configuration attributes and said inquiry;
    receiving references from said at least one search engine;
    processing content from said references according to research rules;
    determining if an existing research model has an association with said inquiry and, if said inquiry is associated with said existing research model, generating a research model based on said existing research model and revising said inquiry based on identified relationships between domain types, domain sub-types, and text passages within said existing research model;
    if said inquiry does not have an association with an existing research model, automatically generating a research model based on said processed content, said research model including at least one domain type; and
    automatically generating a research report from the research model, wherein said research report includes a relational graph illustrating said research model including:
        at least one cluster of a central domain type surrounded by domain sub-type nodes,
        a taxonomy section presenting a recursive list of domain types and domain subtypes, wherein a subtype is a pattern of consecutive keywords, and said keywords are frequently occurring nouns,
        a key relationships section that includes portions of text extracted from said content of said references which correspond to said at least one domain type, and
        a bibliography section listing citations to said references used by said research model.

2. The computer implemented method of claim 1, wherein said configuration attributes specify a list of said search engines and query protocols associated with each of said search engines, said querying step further comprising:
    translating said inquiry to a format associated with each of said at least one search engines.

3. The computer implemented method of claim 2, said translating step further comprising:
    expanding said inquiry to include additional search terms specified by at least one of an electronic dictionary and an electronic thesaurus.

4. The computer implemented method of claim 1, said processing step further comprising:
    merging said references from each of said search engines; and
    removing duplicate references.

5. The computer implemented method of claim 4, said processing step further comprising:
    prioritizing said references according to a prioritization hierarchy specified by said research rules.

6. The computer implemented method of claim 5, said processing step further comprising:
    retrieving copies of content from said references.

7. The computer implemented method of claim 6, said processing step further comprising:
    extracting text from said copied content; and
    determining relevant text passages of said extracted text wherein said relevant text passages are included within said research report.

8. The computer implemented method of claim 7, said processing step further comprising:
    identifying associations within said relevant text passages selected from the group consisting of acronyms, syntactic variants, synonyms, semantic variants, and domain associations; and
    recursively querying said search engines using said identified associations.

9. The computer implemented method of claim 7, said processing step further comprising:
    classifying relationships among said relevant text passages.

10. The computer implemented method of claim 7, said processing step further comprising:
    parsing said relevant text passages into domain types and domain subtypes.

11. The computer implemented method of claim 1, said step of generating a research model comprising:
    generating a relational graph having hierarchically ordered nodes, wherein each node specifies a concept term, said nodes having attributes and being interconnected with links specifying relationships among said nodes, wherein at least one of said nodes includes said at least one domain type.

12. The computer implemented method of claim 11, further comprising:
    identifying data patterns within said relational graph according to said research rules;

recursively querying said search engines for occurrences of said identified data patterns; and incorporating search results corresponding to said data patterns into said relational graph.

13. The computer implemented method of claim 11, further comprising:

including within said research report a visual representation of said research model and a taxonomy specifying a domain of said research model, wherein said taxonomy includes a listing of each central domain type for the research model, and wherein said taxonomy includes within the listing and after each central domain type a listing of each sub-domain types that is associated with the central domain type.

14. The computer implemented method of claim 13, wherein said research report further specifies at least one of a set of text descriptions of key concepts and citations to references used in generating said research model.

15. A machine-readable storage, having stored thereon a computer program having a plurality of code sections executable by a machine for causing the machine to perform the steps of:

responsive to receiving an inquiry, querying at least one search engine in said network as specified by configuration attributes and said inquiry;

receiving references from said at least one search engine;

processing content from said references according to research rules;

determining if an existing research model has an association with said inquiry and, if said inquiry is associated with said existing research model, generating a research model based on said existing research model and revising said inquiry based on identified relationships between domain types, domain sub-types, and text passages within said existing research model;

if said inquiry does not have an association with an existing research model, automatically generating a research model based on said processed content, said research model including at least one domain type; and automatically generating a research report from the research model, wherein said research report includes a relational graph illustrating said research model including:

at least one cluster of a central domain type surrounded by domain sub-type nodes, a taxonomy section presenting a recursive list of domain types and domain subtypes, wherein a sub-type is a pattern of consecutive keywords, and said keywords are frequently occurring nouns, a key relationships section that includes portions of text extracted from said content of said references which correspond to said at least one domain type, and a bibliography section listing citations to said references used by said research model.

16. The machine-readable storage of claim 15, wherein said configuration attributes specify a list of said search engines and query protocols associated with each of said search engines, said querying step further comprising:

translating said inquiry to a format associated with each of said at least one search engines.

17. The machine-readable storage of claim 16, said translating step further comprising:

expanding said inquiry to include additional search terms specified by at least one of an electronic dictionary and an electronic thesaurus.

18. The machine-readable storage of claim 15, said processing step further comprising:

merging said references from each of said search engines; and removing duplicate references.

19. The machine-readable storage of claim 18, said processing step further comprising:

prioritizing said references according to a prioritization hierarchy specified by said research rules.

20. The machine-readable storage of claim 19, said processing step further comprising:

retrieving copies of content from said references.

21. The machine-readable storage of claim 20, said processing step further comprising:

extracting text from said copied content; and determining relevant text passages of said extracted text wherein said relevant text passages are included within said research report.

22. The machine-readable storage of claim 21, said processing step further comprising:

identifying associations within said relevant text passages selected from the group consisting of acronyms, syntactic variants, synonyms, semantic variants, and domain associations; and recursively querying said search engines using said identified associations.

23. The machine-readable storage of claim 21, said processing step further comprising:

classifying relationships among said relevant text passages.

24. The machine-readable storage of claim 21, said processing step further comprising:

parsing said relevant text passages into domain types and domain subtypes.

25. The machine-readable storage of claim 15, said step of generating a research model comprising:

generating a relational graph having hierarchically ordered nodes, wherein each node specifies a concept term, said nodes having attributes and being interconnected with links specifying relationships among said nodes, wherein at least one of said nodes includes said at least one domain type.

26. The machine-readable storage of claim 25, further comprising:

identifying data patterns within said relational graph according to said research rules;

recursively querying said search engines for occurrences of said identified data patterns; and incorporating search results corresponding to said data patterns into said relational graph.

27. The machine-readable storage of claim 25, further comprising:

including within said research report a visual representation of said research model and a taxonomy specifying a domain of said research model, wherein said taxonomy includes a listing of each central domain type for the research model, and wherein said taxonomy includes within the listing and after each central domain type a listing of each sub-domain types that is associated with the central domain type.

28. The machine-readable storage of claim 27, wherein said research report further specifies at least one of a set of text descriptions of key concepts and citations to references used in generating said research model.

* * * * *